(12) United States Patent
Jeong et al.

(10) Patent No.: US 12,313,955 B2
(45) Date of Patent: May 27, 2025

(54) CAMERA MODULE

(71) Applicant: SAMSUNG ELECTRO-MECHANICS CO., LTD., Suwon-si (KR)

(72) Inventors: Seung Hyeon Jeong, Suwon-si (KR); Nam Ki Park, Suwon-si (KR); Yeun Ho Jung, Suwon-si (KR); Young Bok Yoon, Suwon-si (KR); Sung Hoon Kim, Suwon-si (KR); Yoo Chang Kim, Suwon-si (KR); Jae Hyuk Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 18/655,613

(22) Filed: May 6, 2024

(65) Prior Publication Data

US 2024/0288751 A1 Aug. 29, 2024

Related U.S. Application Data

(63) Continuation of application No. 18/341,138, filed on Jun. 26, 2023, now Pat. No. 12,007,669, which is a
(Continued)

(30) Foreign Application Priority Data

Aug. 7, 2018 (KR) .................. 10-2018-0091939

(51) Int. Cl.
*G03B 13/34* (2021.01)
*G02B 7/04* (2021.01)
*H02K 41/035* (2006.01)

(52) U.S. Cl.
CPC ............... *G03B 13/34* (2013.01); *G02B 7/04* (2013.01); *H02K 41/0354* (2013.01)

(58) Field of Classification Search
None
See application file for complete search history.

(56) References Cited

U.S. PATENT DOCUMENTS 10,054,759 B2 8/2018 Kang et al.
2017/0139225 A1 5/2017 Lim
(Continued)

FOREIGN PATENT DOCUMENTS

CN 205880330 U 1/2017
CN 106647107 A 5/2017
(Continued)

OTHER PUBLICATIONS

Chinese Office Action dated Dec. 31, 2020 issued in counterpart Chinese Patent Application No. 201910352956.0. (10 pages in English)(12 pages in Chinese).
(Continued)

*Primary Examiner* — Robert E. Tallman
(74) *Attorney, Agent, or Firm* — NSIP Law

(57) ABSTRACT

A camera module includes a housing accommodating a lens module, a driving unit including a magnet disposed on the lens module and a coil disposed to face the magnet, a yoke generating attractive force with the magnet, a first ball member accommodated in a first receiving space disposed between the lens module and the housing, and pressed by the attractive force, and a second ball member accommodated in a second receiving space disposed between the lens module and the housing, and pressed by the attractive force. A length of the first receiving space in an optical axis direction is different from a length of the second receiving space in the optical axis direction.

20 Claims, 5 Drawing Sheets

Related U.S. Application Data continuation of application No. 17/368,106, filed on Jul. 6, 2021, now Pat. No. 11,726,391, which is a continuation of application No. 16/365,986, filed on Mar. 27, 2019, now Pat. No. 11,086,195.

(56) References Cited

U.S. PATENT DOCUMENTS

| | | |
|---|---|---|
| 2017/0261720 A1 | 9/2017 | Kang et al. |
| 2017/0357077 A1 | 12/2017 | Kim et al. |
| 2018/0173081 A1 | 6/2018 | Kim et al. |
| 2018/0246293 A1 | 8/2018 | Lim et al. |

FOREIGN PATENT DOCUMENTS

| | | |
|---|---|---|
| CN | 106707454 A | 5/2017 |
| CN | 207636905 U | 7/2018 |
| KR | 10-1704498 B1 | 2/2017 |
| KR | 10-1771439 B1 | 8/2017 |
| KR | 10-1779817 B1 | 9/2017 |
| KR | 10-2017-0139277 A | 12/2017 |
| KR | 10-2018-0007841 A | 1/2018 |
| WO | WO 2018/012733 A1 | 1/2018 |

OTHER PUBLICATIONS

Korean Office Action issued on Feb. 10, 2020 in corresponding Korean Patent Application No. 10-2018-0091939 (9 pages in English, 6 pages in Korean).

CAMERA MODULE

CROSS-REFERENCE TO RELATED APPLICATION

This application is a continuation of U.S. application Ser. No. 18/341,138 filed on Jun. 26, 2023, which is a continuation of U.S. application Ser. No. 17/368,106 filed on Jul. 6, 2021, which is now U.S. Pat. No. 11,726,391, which is a continuation of U.S. application Ser. No. 16/365,986 filed on Mar. 27, 2019, which is now U.S. Pat. No. 11,086,195, which claims the benefit of 35 U.S.C. § 119 (a) of Korean Patent Application No. 10-2018-0091939 filed on Aug. 7, 2018 in the Korean Intellectual Property Office, the entire disclosures of which are incorporated herein by reference for all purposes.

BACKGROUND

1. Field

The following description relates to a camera module.

2. Description of Background

Camera modules have been used in mobile communications terminals such as smartphones, tablet PCs, notebook computers, and the like. Such camera modules have a focus adjustment function for generating high-resolution images.

When the focus is adjusted, a lens module is moved in an optical axis direction by an actuator. When the lens module is moved, a plurality of ball bearings and the like may be used to support the movement of the lens module in the optical axis direction. The plurality of ball bearings may contact the lens module and roll in the optical axis direction to support the lens module.

The plurality of ball bearings need to contact and support the lens module. However, it may be significantly difficult to make the sizes of the plurality of ball bearings exactly the same in a manufacturing process. Thus, the sizes of the plurality of ball bearings may be different from each other.

In the case in which there is a slight difference in the size of the plurality of ball bearings, only portions of the ball bearings may come in contact with the lens module, which may cause tilt when the lens module is moved in the optical axis direction.

Furthermore, in a process in which the lens module is moved in an optical axis direction, the ball bearings contacting the lens module may be changed, thereby causing a continuous tilt phenomenon in which the lens module tilts.

Further, since the size difference between the plurality of ball bearings is difficult to visually determine, there may be a problem in that it may be difficult to predict which of the plurality of balls will contact the lens module.

Moving a lens module in parallel in an optical axis direction may be very important in focus adjustment. Therefore, it is necessary to prevent tilt from occurring when the lens module moves.

Meanwhile, the size of a camera module used in a mobile communications terminal has gradually been reduced. As the size of the camera module has been reduced, the problem of resolution degradation due to lens module tilt has increased.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a camera module in which tilt may be prevented from occurring when a lens module is moved in an optical axis direction.

In another general aspect, a camera module includes a housing accommodating a lens module; a driving unit including a magnet disposed on the lens module and a coil disposed to face the magnet; a yoke generating attractive force with the magnet; a first ball member accommodated in a first receiving space disposed between the lens module and the housing, and pressed by the attractive force; and a second ball member accommodated in a second receiving space disposed between the lens module and the housing, and pressed by the attractive force. A length of the first receiving space in an optical axis direction is different from a length of the second receiving space in the optical axis direction.

The first ball member may include first balls disposed in the optical axis direction and the second ball member may include second balls disposed in the optical axis direction, and at least two of the first balls may have differing sizes.

A number of the first balls may be different from a number of the second balls.

An uppermost ball and a lowermost ball in the optical axis direction, among the first balls, may be greater in size than at least one ball located between the uppermost ball and the lowermost ball, and the second balls may have sizes corresponding to each other.

A first uppermost ball and a first lowermost ball in the optical axis direction, among the first balls, may be greater in size than at least one ball located between the first uppermost ball and the first lowermost ball, and a second uppermost ball and a second lowermost ball in the optical axis direction, among the second balls, may be greater in size than at least one ball located between the second uppermost ball and the second lowermost ball.

The camera module may include a case coupled to the housing to enclose at least a portion of an outer surface of the housing.

The housing may include a first protrusion protruding toward the first ball member and a second protrusion protruding toward the second ball member.

A length of the first protrusion may be different from a length of the second protrusion in the optical axis direction.

The case may include a third protrusion protruding toward the first ball member and a fourth protrusion protruding toward the second ball member.

A length of the third protrusion may be different from a length of the fourth protrusion in the optical axis direction.

In another general aspect, a camera module includes a housing accommodating a lens module; a driving unit including a magnet disposed on the lens module and a coil disposed to face the magnet; a yoke generating attractive force with the magnet; a first ball member disposed between the lens module and the housing and pressed by the attractive force, and including first balls arranged in an optical axis direction; and a second ball member disposed between the lens module and the housing, and pressed by the attractive force, and including second balls arranged in the optical axis direction. A first distance between a center of a first uppermost ball and a center of a first lowermost ball in the optical axis direction, among the first balls, is different from a second distance between a center of a second uppermost ball and a center of a second lowermost ball, among the second balls.

A number of the first balls may be different from a number of the second balls, the first uppermost ball and the first lowermost ball may be greater in size than at least one ball located between the first uppermost ball and the first lowermost ball, and the second uppermost ball and the second lowermost ball may be greater in size than at least one ball located between the second uppermost ball and the second lowermost ball.

A number of the first balls may be different from a number of the second balls, the first uppermost ball and the first lowermost ball may be greater in size than at least one ball located between the first uppermost ball and the first lowermost ball, and the second balls may have sizes corresponding to each other.

The second lowermost ball may be disposed higher than the first lowermost ball in the optical axis direction.

The second uppermost ball may be disposed lower than the first uppermost ball in the optical axis direction.

In another general aspect, a camera module includes a housing including a first receiving groove and a second receiving groove; a lens module accommodated in the housing and including a third receiving groove facing the first receiving groove and a fourth receiving groove facing the second receiving groove; first ball bearings disposed is a first space defined by the first receiving groove and the third receiving groove; and second ball bearings disposed is a second space defined by the second receiving groove and the fourth receiving groove. The housing includes a first protrusion protruding into the first space and a second protrusion protruding into the second space, and a length of the first protrusion in an optical axis direction is different from a length of the second protrusion in the optical axis direction.

The lens module may include a third protrusion protruding into the first space and a fourth protrusion protruding into the second space, and a length of the third protrusion in the optical axis direction may be different from a length of the fourth protrusion in the optical axis direction.

A length of the first space in the optical axis direction may be different from a length of the second space in the optical axis direction.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
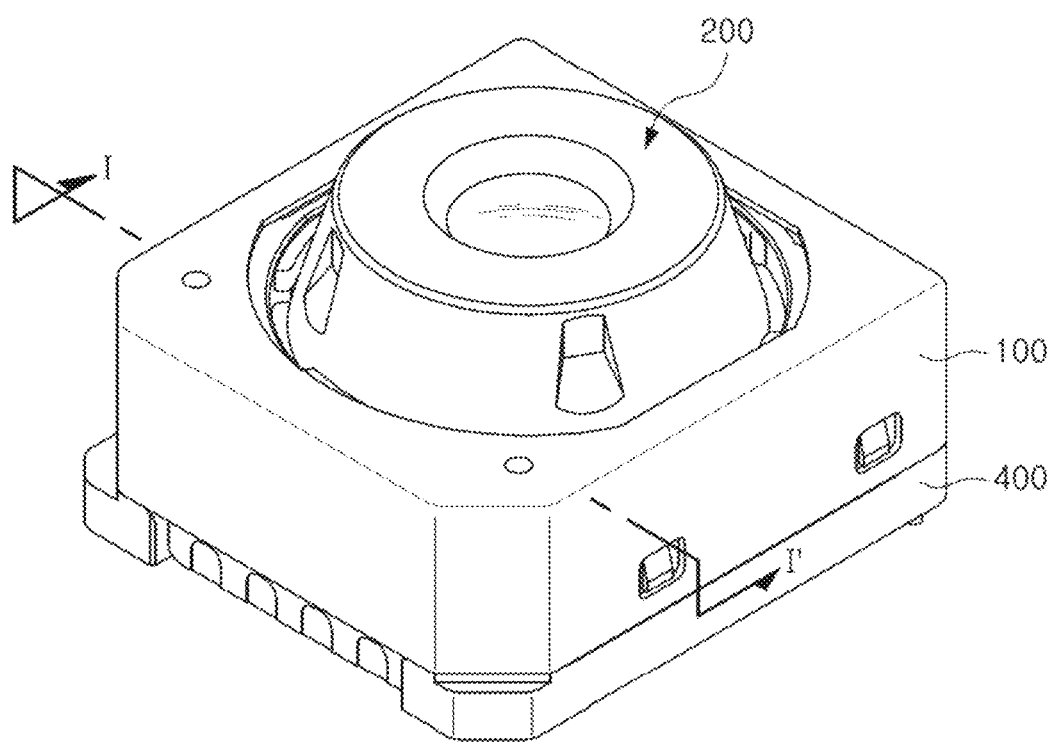
FIG. 1 is a perspective view illustrating an example of a camera module.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after gaining an understanding of the disclosure of this application. For example, the sequences of operations described herein are merely examples, and are not limited to those set forth herein, but may be changed, as will be apparent after gaining an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have merely been provided to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there may be no other elements intervening therebetween.

The terminology used herein is for describing various examples only, and is not to be used to limit the disclosure. As used herein, the term "and/or" includes any one and any combination of any two or more of the associated listed items. The articles "a," "an," and "the" are intended to include the plural forms as well, unless the context clearly indicates otherwise.

The use of the term "may" with respect to an example or embodiment, e.g., as to what an example or embodiment may include or implement, means that at least one example or embodiment exists in which such a feature is included or implemented while all examples and embodiments are not limited thereto.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower," relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

Due to manufacturing techniques and/or tolerances, variations of the shapes shown in the drawings may occur. Thus, the examples described herein are not limited to the specific shapes shown in the drawings, but include changes in shape that occur during manufacturing.

The camera module may be applied to portable electronic devices such as a mobile communications terminal, a smart phone, a tablet PC or the like.

Figure 2:
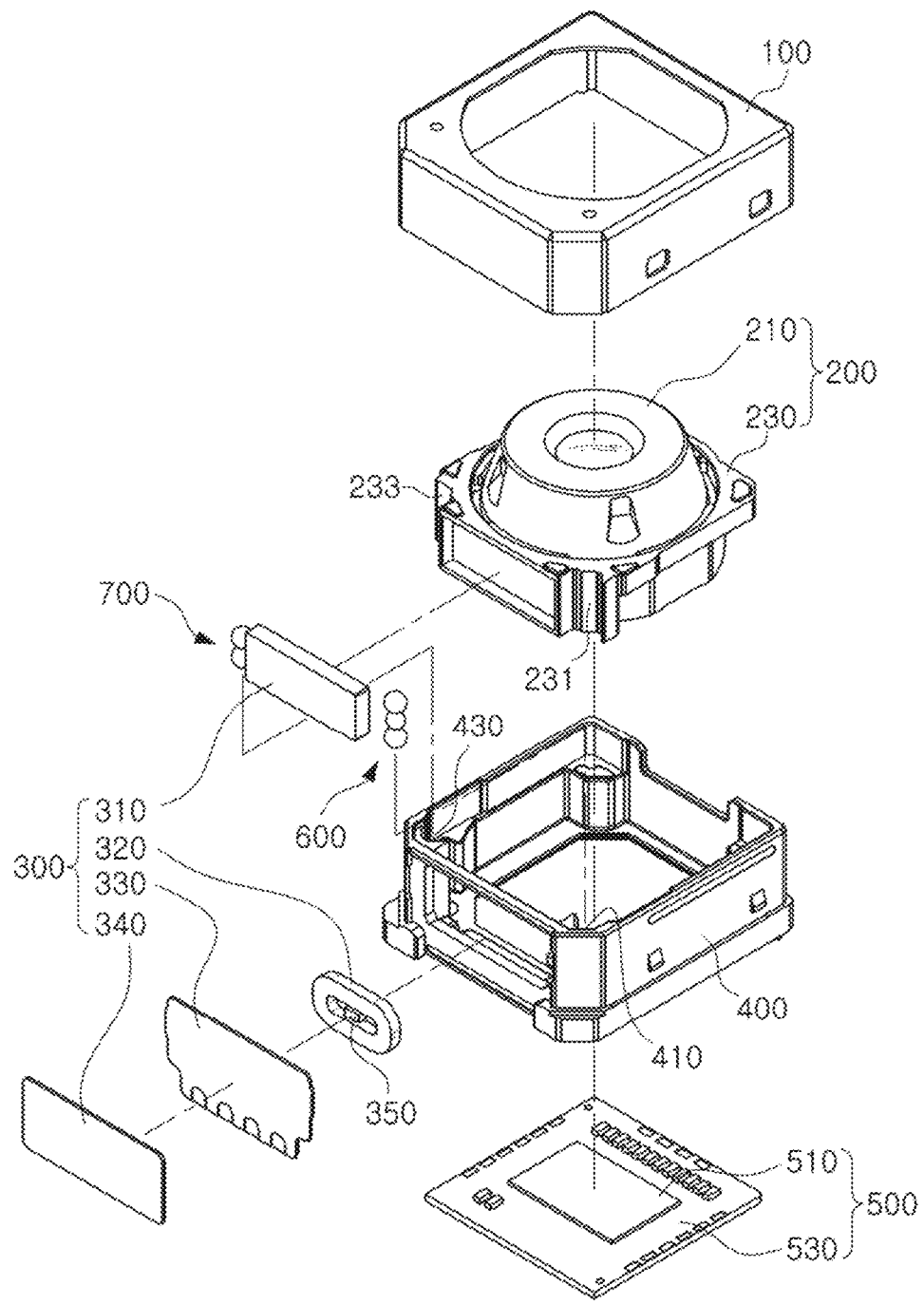
FIG. 2 is a schematic exploded perspective view illustrating an example of a camera module.

FIG. 1 is a perspective view illustrating an example of a camera module, and FIG. 2 is a schematic exploded perspective view illustrating an example of the camera module.

Referring to FIGS. 1 and 2, a camera module includes a lens module 200, a driving unit 300 moving the lens module 200, an image sensor module 500 converting light incident through the lens module 200 into an electrical signal, and a housing 400 and a case 100 receiving the lens module 200.

The lens module 200 includes a lens barrel 210 and a carrier 230.

The lens barrel 210 may receive at least one lens capturing an object. When a plurality of lenses are disposed, the plurality of lenses are mounted inside the lens barrel 210 along an optical axis. The lens barrel 210 may have a hollow cylindrical shape.

The lens barrel 210 is coupled to the carrier 230, and the lens barrel 210 and the carrier 230 are housed in the housing 400 and the case 100. The case 100 is coupled to the housing 400 to surround an outer surface of the housing 400.

The lens barrel 210 is configured to be movable together with the carrier 230 in the direction of an optical axis.

For example, the lens module 200 may be moved in the optical axis direction to adjust a focus, and the driving unit 300 is provided to move the lens module 200.

The image sensor module 500 is disposed below the housing 400. The image sensor module 500 converts light incident through the lens module 200 into an electric signal.

The image sensor module 500 may include an image sensor 510, and a printed circuit board 530 connected to the image sensor 510, and may further include an infrared filter.

The infrared filter functions to block light in an infrared region, in the light incident through the lens module 200.

The image sensor 510 converts the light incident through the lens barrel 210 into an electric signal. In an example, the image sensor 510 may be a charge coupled device (CCD) or a complementary metal-oxide semiconductor (CMOS).

The electric signal converted by the image sensor 510 is output as an image through a display unit of a portable electronic device.

The image sensor 510 is fixed to the printed circuit board 530, and is electrically connected to the printed circuit board 530 by wire bonding.

The driving unit 300 includes a magnet 310 and a coil 320. The magnet 310 may be provided in the lens module 200, and the coil 320 may be disposed to face the magnet 310.

In an example, the magnet 310 may be mounted on one surface of the carrier 230, and the coil 320 may be provided on one surface of a substrate 330 mounted in the housing 400. The magnet 310 and the coil 320 may be disposed to face each other in a direction perpendicular to the optical axis direction.

When power is applied to the coil 320, the carrier 230 may be moved in the optical axis direction by influence of electromagnetic force between the magnet 310 and the coil 320.

Since the lens barrel 210 is mounted in the carrier 230, the lens barrel 210 is also moved in the optical axis direction by movement of the carrier 230.

A first ball member 600 and a second ball member 700 may be disposed between the lens module 200 and the housing 400, to reduce friction between the lens module 200 and the housing 400, when the lens module 200 is moved in the optical axis direction.

A first receiving space is formed between the lens module 200 and the housing 400, and the first ball member 600 is accommodated in the first receiving space. A second receiving space is also formed between the lens module 200 and the housing 400, and the second ball member 700 is accommodated in the second receiving space.

The housing 400 is provided with a first receiving groove 410 and a second receiving groove 430, and the lens module 200 is provided with a third receiving groove 231 and a fourth receiving groove 233. Each of the first receiving groove 410, the second receiving groove 430, the third receiving groove 231, and the fourth receiving groove 233 extend to have a length in an optical axis direction.

The first receiving groove 410 and the third receiving groove 231 are disposed to face each other in a direction perpendicular to the optical axis direction, and a space between the first receiving groove 410 and the third receiving groove 231 functions as the first receiving space for accommodating the first ball member 600. The second receiving groove 430 and the fourth receiving groove 233 are disposed to face each other in the direction perpendicular to the optical axis direction, and a space between the second receiving groove 430 and the fourth receiving groove 233 functions as the second receiving space for accommodating the second ball member 700.

The first ball member 600 is disposed between the first receiving groove 410 and the third receiving groove 231, and the second ball member 700 is disposed between the second receiving groove 430 and the fourth receiving groove 233.

The first receiving groove 410, the second receiving groove 430, and the third receiving groove 231 have a substantially '\/'-shaped cross section, and the fourth receiving groove 233 has a substantially '¬'-shaped cross section.

Thus, the first ball member 600 may be in two-point contact with the first receiving groove 410, and may also be in two-point contact with the third receiving groove 231. The second ball member 700 may be in two-point contact with the second receiving groove 430, and may be in one-point contact with the fourth receiving groove 233.

For example, the first ball member 600 may be in four-point contact with an object, and the second ball member 700 may be in three-point contact with the object.

The first ball member 600 accommodated in the first receiving space between the first receiving groove 410 and the third receiving groove 231 may function as a main guide, and the second ball member 700 accommodated in the second receiving space between the second receiving groove 430 and the fourth receiving groove 233 may function as an auxiliary guide.

In an example, a closed loop control method of detecting and feeding back a position of the lens module 200 is used.

Thus, a position detector 350 is provided for closed loop control. The position detector 350 may be a Hall sensor, and may be disposed in a central portion of the coil 320. The position detector 350 may be formed integrally with a driver IC, applying power to the coil 320.

A yoke 340 is disposed on the other surface of the substrate 330 (opposite surface of the substrate 330 from the coil 320/detector 350). Thus, the yoke 340 is disposed to face the magnet 310 in a direction perpendicular to the optical axis direction, with the coil 320 interposed between the yoke 340 and the magnet 310.

The yoke 340 is formed of a material capable of generating attractive force between the yoke 340 and the magnet 310, such that attraction may be exerted between the yoke 340 and the magnet 310 in a direction perpendicular to the optical axis direction.

The first ball member 600 and the second ball member 700 are pressed by the attractive force between the yoke 340 and the magnet 310, in such a manner that the first ball member 600 and the second ball member 700 may maintain contact with the lens module 200 and the housing 400.

Figure 3:
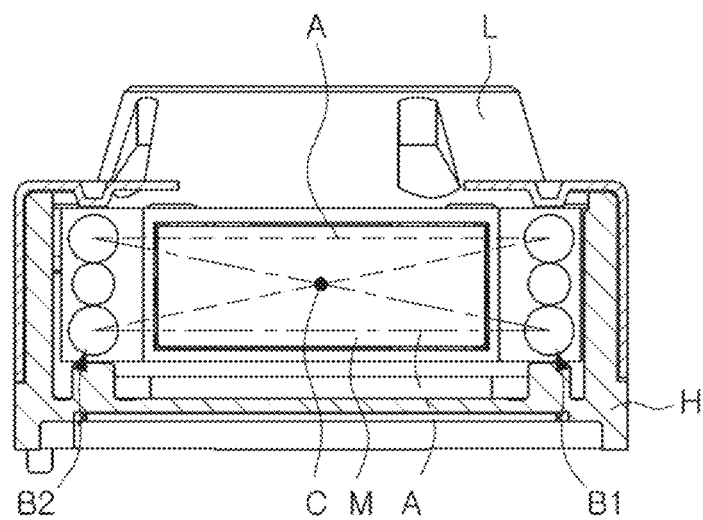
FIG. 3 is a view illustrating a case in which tilt occurs during movement of a lens module.
Figure 4:
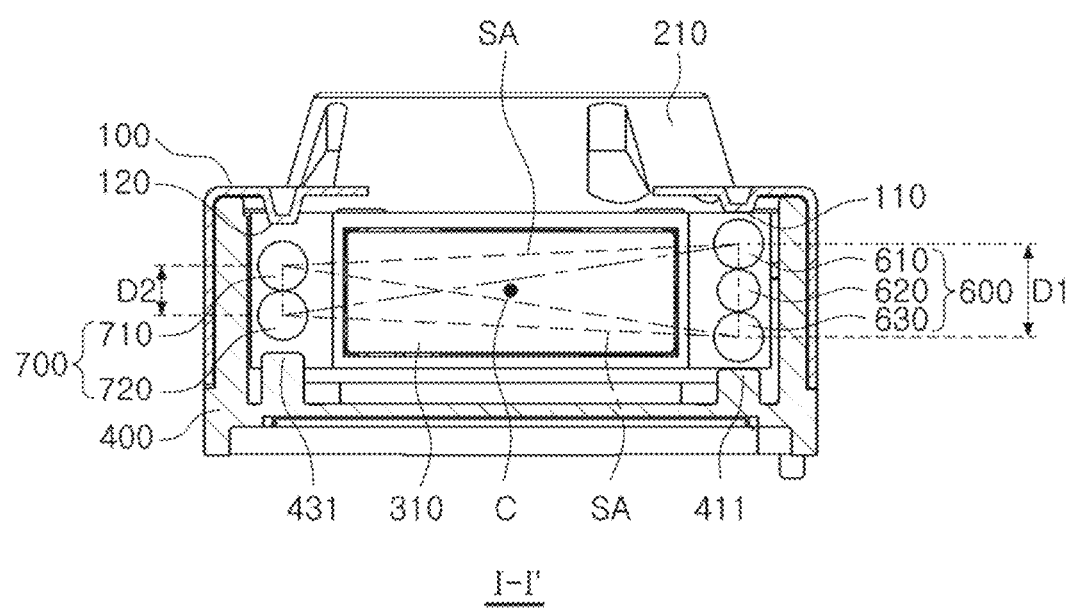
FIG. 4 is a cross-sectional view taken along line I-I' of FIG. 1.

FIG. 3 is a view illustrating a case in which tilt occurs during movement of a lens module, and FIG. 4 is a cross-sectional view taken along line I-I' of FIG. 1.

Figure 5:
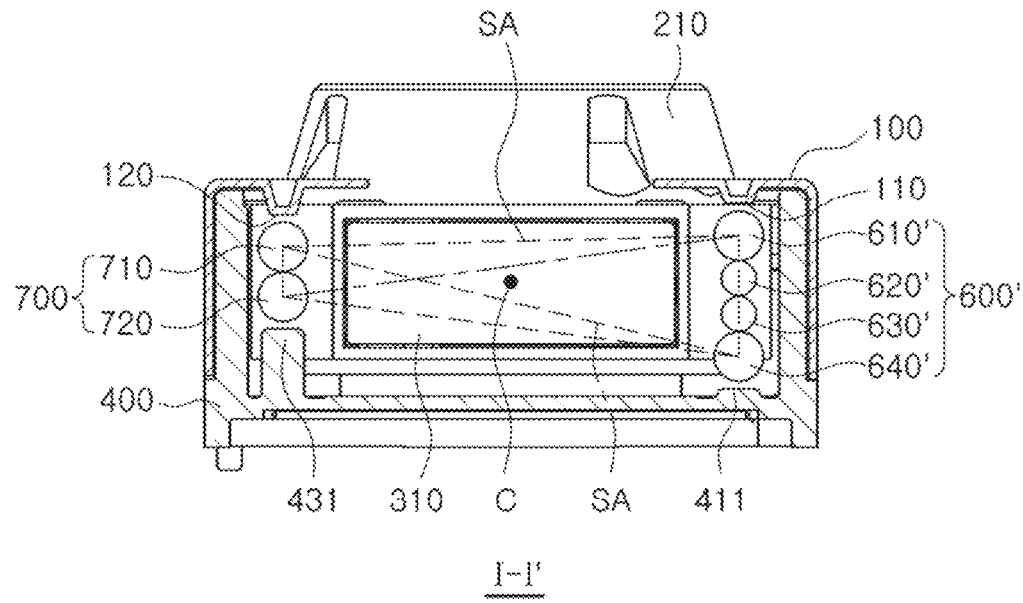
FIG. 5 is a modified example of FIG. 4.
Figure 6:
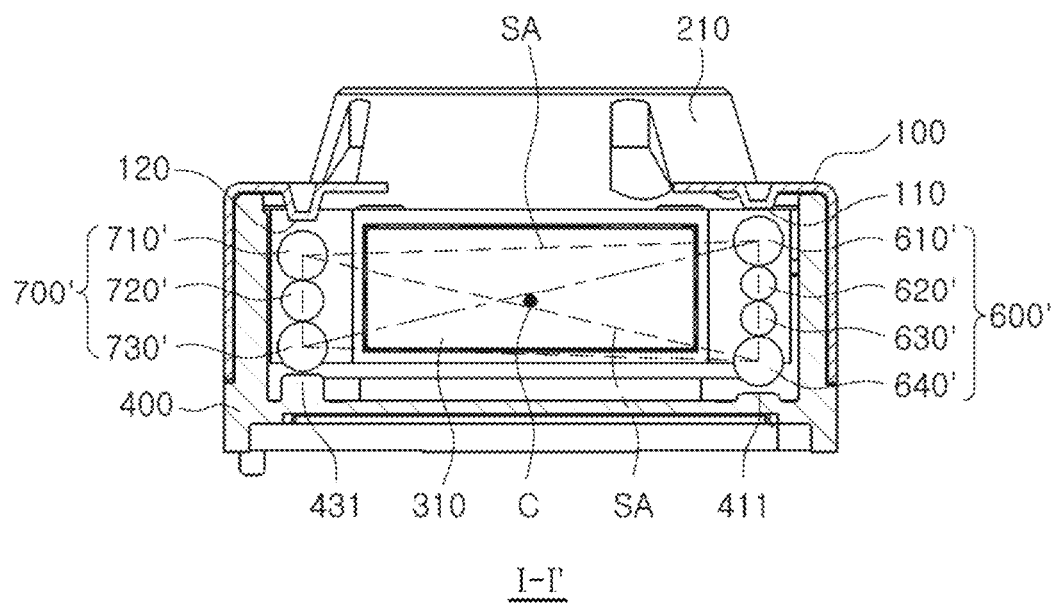
FIG. 6 is another modified example of FIG. 4.

FIG. 5 is a modified example of FIG. 4, and FIG. 6 is another modified example of FIG. 4.

Figure 7:
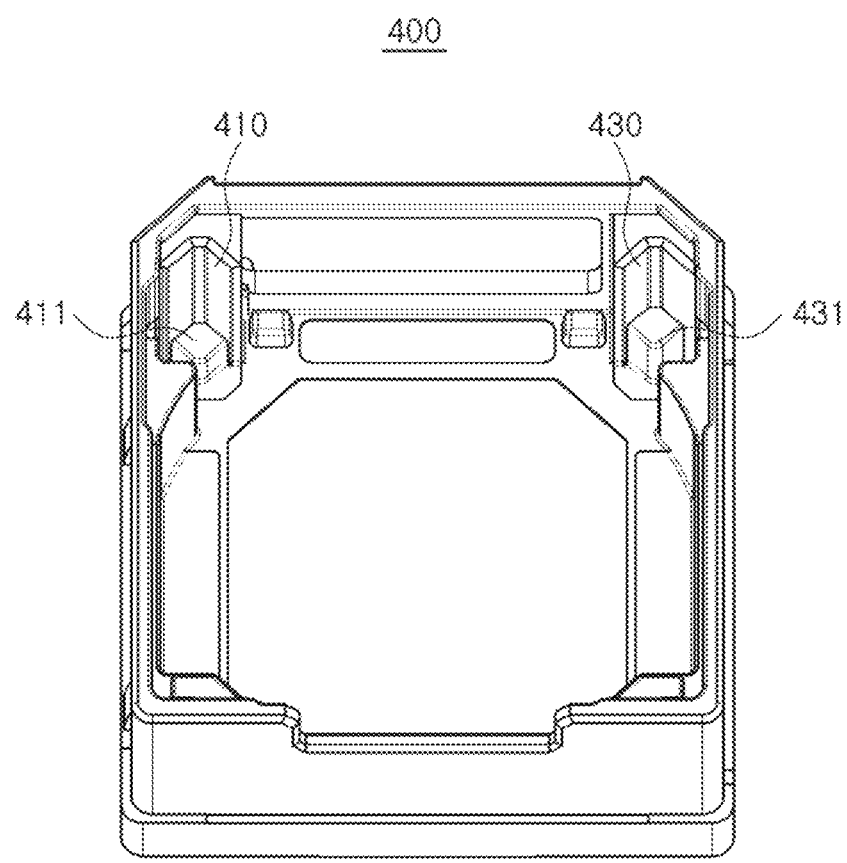
FIG. 7 is a perspective view illustrating an example of a housing.

FIG. 7 is a perspective view illustrating an example of a housing.

Referring to FIG. 3, in the case of a general camera module capable of adjusting focus, a plurality of ball bearings B1 and B2 are disposed, respectively on both sides of a magnet M.

A yoke is disposed to face the magnet M in a direction perpendicular to an optical axis direction. The yoke is a fixing member and the magnet M is a moving member, such that the magnet M is pulled toward the yoke by attractive force acting between the magnet M and the yoke. Thus, a lens module L on which the magnet M is mounted is also pulled toward the yoke.

Thus, the plurality of ball bearings B1 and B2 are brought into contact with the lens module L and a housing H, by the attractive force between the magnet M and the yoke. In this state, the plurality of ball bearings B1 and B2 support the lens module L when the lens module L is moved in the optical axis direction.

When the sizes of the plurality of ball bearings B1 and B2 are all the same, all the ball bearings contact the lens module L, so that the lens module L may be stably supported.

For example, as illustrated in FIG. 3, in the case in which respectively three ball bearings B1 and B2 disposed on both sides of the magnet M are all in contact with the lens module L and the housing H, the lens module L may be stably supported.

However, it is relatively very difficult to physically make the sizes of the plurality of ball bearings B1 and B2 completely equal. Thus, even when the sizes of the plurality of ball bearings B1 and B2 are all made the same, the sizes of the plurality of actually manufactured ball bearings B1 and B2 may be different from each other.

As described above, in the case in which there is a slight difference in the size of the plurality of ball bearings B1 and B2, only a portion of ball bearings comes into contact with the lens module L, and thus, tilt may occur when the lens module L is moved in the optical axis direction.

To prevent tilt from occurring in a process of moving the lens module L, a center point C of action of attractive force acting between the magnet M and the yoke is required to be located within a support region A provided by connecting points of contact between the plurality of ball bearings B1 and B2 and the lens module L or the housing H.

However, in a case in which only portions of the plurality of ball bearings B1 and B2 contact the lens module L, the center point C of action of the attractive force may be located in a region deviating from the support region A during movement of the lens module L.

In this case, a position of the lens module L may be changed during the movement of the lens module L, which may cause tilt.

Referring to FIG. 4, the first ball member 600 and the second ball member 700 are disposed on both sides of the magnet 310, and each of the first ball member 600 and the second ball member 700 includes a plurality of balls disposed in the optical axis direction.

In the case of a camera module according to an example, a size, for example, a diameter, of a portion of a plurality of balls may be intentionally formed to be greater than a size, for example, a diameter, of remaining balls. In this case, relatively large balls, among the plurality of balls, may intentionally contact the lens module 200.

For example, the size of uppermost balls and lowermost balls among the plurality of balls in an optical axis direction may be greater than the size of balls located between the respective uppermost balls and lowermost balls.

Among the plurality of balls of the first ball member 600, an uppermost ball 610 and a lowermost ball 630 in the optical axis direction are greater in size (for example, greater in diameter) than a ball 620 located between the uppermost ball 610 and the lowermost ball 630. Balls 710 and 720 of the second ball member 700 have sizes corresponding (relatively equal) to each other.

The uppermost ball 610 and the lowermost ball 630 among the plurality of balls of the first ball member 600 in the optical axis direction, and the balls 710 and 720 of the second ball member 700, may have sizes corresponding (relatively equal) to each other.

The number of balls of the first ball member 600 and the number of balls of the second ball member 700 are different. For example, the number of balls of the first ball member 600 is greater than the number of balls of the second ball member 700. In this example, the first ball member 600 includes three balls (610, 620, and 630), and the second ball member 700 includes two balls (710 and 720).

In the case of the first ball member 600, the uppermost ball 610 and the lowermost ball 630 contact the lens module 200, and in the case of the second ball member 700, both balls 710 and 720 come into contact with the lens module 200, for example at four support points.

In this case, a support region SA, connecting the contact points between the first ball member 600 and the lens module 200 and the contact points between the second ball member 700 and the lens module 200, may have a rectangular shape, for example, a trapezoidal shape.

Thus, by intentionally contacting portions of the balls with the lens module 200, the center portion of action of attractive force between the magnet 310 and the yoke 340 may be located in the support region SA, connecting points of contact between portions of the balls and the lens module 200.

Even when the uppermost ball 610 and the lowermost ball 630 among the balls of the first ball member 600, and the balls 710 and 720 of the second ball member 700, are formed to have corresponding sizes to each other, the sizes thereof after manufacture may be different from each other.

In this case, the uppermost ball 610 and the lowermost ball 630 among the balls of the first ball member 600 may be in contact with the lens module 200, and only one of the balls of the second ball member 700 may be in contact with the lens module 200, for example, at three support points.

In this case, the support region SA, connecting the contact points between the first ball member 600 and the lens module 200 and the contact points between the second ball member 700 and the lens module 200, may have a triangular shape. Thus, the support region SA may be reduced, as compared with the case of four-point support.

However, in the case of the disclosed examples, the center point C of action of the attractive force between the magnet 310 and the yoke 340 may be positioned in the support region SA even when the support region SA is triangular.

In an example, a size of the first receiving space in the optical axis direction, in which the first ball member 600 is accommodated, and a size of the second receiving space in the optical axis direction, in which the second ball member 700 is accommodated, may be formed to be different from each other.

For example, the size of the first receiving space in the optical axis direction may be greater than the size of the second receiving space in the optical axis direction.

Thus, a distance D1 between centers of the uppermost ball 610 and the lowermost ball 630 of the first ball member 600 in the optical axis direction accommodated in the first receiving space, is different from a distance D2 between centers of the uppermost ball 710 and the lowermost ball 720 in the optical axis direction, among the balls of the second ball member 700 accommodated in the second receiving space.

For example, the distance D1 between the centers of the uppermost ball 610 and the lowermost ball 630 in the optical axis direction, among the balls of the first ball member 600 accommodated in the first receiving space, is greater than the distance D2 between the centers of the uppermost ball 710 and the lowermost ball 720 in the optical axis direction, among the balls of the second ball member 700 accommodated in the second receiving space.

The housing 400 includes a first protrusion 411 protruding toward the first ball member 600, and a second protrusion 431 protruding toward the second ball member 700.

The first protrusion 411 and the second protrusion 431 have different lengths in the optical axis direction. For example, the length of the second protrusion 431 in the optical axis direction is greater than the length of the first protrusion 411 in the optical axis direction.

As illustrated in FIG. 4, the lowermost ball 720 among the balls of the second ball member 700 in the optical axis direction is disposed to be higher than the lowermost ball 630 among the balls of the first ball member 600 in the optical axis direction, when viewed in a direction perpendicular to the optical axis direction.

Thus, even when the support region SA connecting the contact points between the first ball member 600 and the lens module 200 and the contact points between the second ball member 700 and the lens module 200 has a triangular shape, angles formed by respective sides of a triangle may all be acute.

Therefore, even when the support region SA is triangular, since the center point C of action of the attractive force between the magnet 310 and the yoke 340 may be located within the support region SA, tilt may be effectively prevented from occurring during a movement process of the lens module 200.

The case 100 is provided with a third protrusion 110 protruding toward the first ball member 600 and a fourth protrusion 120 protruding toward the second ball member 700.

In this case, the third protrusion 110 and the fourth protrusion 120 have different lengths in the optical axis direction. For example, the length of the fourth protrusion 120 in the optical axis direction is greater than the length of the third protrusion 110 in the optical axis direction.

As illustrated in FIG. 4, the uppermost ball 710 among the balls of the second ball member 700 in the optical axis direction is disposed to be lower than the uppermost ball 610 among the balls of the first ball member 600 in the optical axis direction, when viewed in a direction perpendicular to the optical axis.

Therefore, even when the support region SA connecting the contact points between the first ball member 600 and the lens module 200 and the contact points between the second ball member 700 and the lens module 200 has a triangular shape, angles formed by respective sides of a triangle may all be acute.

Therefore, even when the support region SA is triangular, since the center point C of action of the attractive force between the magnet 310 and the yoke 340 may be located within the support region SA, tilt may be effectively prevented from occurring during a movement process of the lens module 200.

Referring to FIG. 5, in another example, a first ball member 600' may include four balls, and a second ball member 700' may include two balls.

Among the four balls of the first ball member 600', uppermost and lowermost balls 610' and 640' in an optical axis direction are greater in size (for example, greater in diameter) than balls 620' and 630' located between the uppermost and lowermost balls 610' and 640'.

Thus, even in a case in which a support region SA, connecting contact points between the first ball member 600' and the lens module 200 and contact points between the second ball member 700 and the lens module 200, has a rectangular shape or a triangular shape, since angles formed by respective sides of a triangle may all be acute, a center point C of action of attractive force between a magnet 310 and a yoke 340 may be within the support region SA.

Referring to FIG. 6, in another example, a first ball member 600' may include four balls, and a second ball member 700' may include three balls.

Among the four balls of the first ball member 600', uppermost and lowermost balls 610' and 640' in an optical axis direction are greater in size (for example, greater in diameter) than balls 620' and 630' located between the uppermost and lowermost balls 610' and 640', and among the three balls of the second ball member 700', uppermost and lowermost balls 710' and 730' in an optical axis direction are greater in size (for example, greater in diameter) than a ball 720' located between the uppermost and lowermost balls 710' and 730'.

Thus, even in a case in which a support region SA, connecting contact points between the first ball member 600' and the lens module 200 and contact points between the second ball member 700' and the lens module 200, has a rectangular shape or a triangular shape, since angles formed by respective sides of a triangle may all be acute, a center point C of action of attractive force between a magnet 310 and a yoke 340 may be within the support region SA.

FIG. 7 illustrates an example of the housing 400, as described with respect to FIG. 4. The housing 400 includes the first protrusion 411 protruding therefrom, and the first protrusion 411 defines a lower end of the first receiving groove 410. The housing 400 also includes the second protrusion 431 protruding therefrom, and the second protrusion 431 defines a lower end of the second receiving groove 430. As discussed above, a length of the second protrusion 431 in the optical axis direction may be greater than a length of the first protrusion 411 in the optical axis direction.

Through the above-described examples, the camera module according to the example of the present disclosure may prevent tilt from occurring when the lens module is moved in the optical axis direction.

As set forth above, a camera module according to the examples may prevent tilt occurring when a lens module is moved in an optical axis direction.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects of the present disclosure in each example are to be considered as being applicable to similar features or aspects of the present disclosure in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
a lens module;
a housing accommodating the lens module;
a first ball member disposed between the lens module and the housing and comprising a plurality of balls; and
a second ball member disposed between the lens module and the housing and comprising a plurality of balls,
wherein a first receiving space and a second receiving space are disposed between the lens module and the housing,
wherein the first receiving space extends in an optical axis direction and accommodates the first ball member,
wherein the second receiving space extends in the optical axis direction and accommodates the second ball member, and
wherein a sum of the diameters of the plurality of balls of the first ball member is different from a sum of the diameters of the plurality of balls of the second ball member.

2. The camera module of claim 1, wherein the first ball member and the second ball member are spaced apart from each other in a direction perpendicular to the optical axis direction, and
wherein a number of the plurality of balls of the first ball member is greater than a number of the plurality of balls of the second ball member.

3. The camera module of claim 1, wherein a length of the first receiving space in the optical axis direction is greater than a length of the second receiving space in the optical axis direction.

4. The camera module of claim 1, wherein an uppermost ball and a lowermost ball in the optical axis direction, among the plurality of balls of the first ball member, have a greater diameter than at least one ball located between the uppermost ball and the lowermost ball.

5. The camera module of claim 1, wherein an uppermost ball and a lowermost ball in the optical axis direction, among the plurality of balls of the first ball member, have a first diameter, at least one ball located between the uppermost ball and the lowermost ball has a second diameter, and the first diameter is greater than the second diameter, and
wherein the plurality of balls of the second ball member includes two balls disposed along the optical axis direction, and the two balls of the second ball member each have a greater diameter than the second diameter.

6. The camera module of claim 1, wherein a distance between a first uppermost ball and a first lowermost ball in the optical axis direction, among the plurality of balls of the first ball member, are greater than a distance between a second uppermost ball and a second lowermost ball in the optical axis direction, among the plurality of the second ball member.

7. The camera module of claim 1, wherein the housing comprises a first protrusion protruding toward the first ball member and a second protrusion protruding toward the second ball member.

8. The camera module of claim 7, wherein a length of the second protrusion in the optical axis direction is greater than a length of the first protrusion in the optical axis direction.

9. The camera module of claim 8, further comprising a case coupled to the housing,
wherein the case comprises a third protrusion protruding toward the first ball member and a fourth protrusion protruding toward the second ball member, and
wherein a distance between the first protrusion and the third protrusion in the optical axis direction is greater than a distance between the second protrusion and the fourth protrusion in the optical axis direction.

10. The camera module of claim 1, further comprising a case coupled to the housing,
wherein the case comprises a third protrusion protruding toward the first ball member and a fourth protrusion protruding toward the second ball member, and
wherein a length of the fourth protrusion in the optical axis direction is greater than a length of the third protrusion in the optical axis direction.

11. A camera module comprising:
a lens module;
a housing accommodating the lens module;
a first ball member disposed between the lens module and the housing and comprising a plurality of balls; and
a second ball member disposed between the lens module and the housing and comprising a plurality of balls,
wherein a first protrusion protruding toward the first ball member and a second protrusion protruding toward the second ball member are disposed to the housing, and
wherein a sum of the diameters of the plurality of balls of the first ball member is different from a sum of the diameters of the plurality of balls of the second ball member.

12. The camera module of claim 11, wherein a length of the second protrusion in an optical axis direction is greater than a length of the first protrusion in the optical axis direction.

13. The camera module of claim 11, wherein a number of the plurality of balls of the first ball member is greater than a number of the plurality of balls of the second ball member.

14. The camera module of claim 11, wherein the first ball member and the second ball member are spaced apart from each other in a direction perpendicular to an optical axis direction, and
an uppermost ball and a lowermost ball in the optical axis direction, among the plurality of balls of the first ball member, have a greater diameter than at least one ball located between the uppermost ball and the lowermost ball.

15. The camera module of claim 11, wherein an uppermost ball and a lowermost ball in an optical axis direction, among the plurality of balls of the first ball member, have a first diameter, at least one ball located between the uppermost ball and the lowermost ball has a second diameter, and the first diameter is greater than the second diameter, and
wherein the plurality of balls of the second ball member includes two balls disposed along the optical axis direction, and the two balls of the second ball member each have a greater diameter than the second diameter.

16. The camera module of claim 11, further comprising a case coupled to the housing,
wherein the case comprises a third protrusion protruding toward the first ball member and a fourth protrusion protruding toward the second ball member, and
wherein a distance between the first protrusion and the third protrusion in an optical axis direction is greater than a distance between the second protrusion and the fourth protrusion in the optical axis direction.

17. A camera module comprising:
a housing comprising a first receiving groove and a second receiving groove;
a lens module accommodated in the housing and comprising a third receiving groove facing the first receiving groove and a fourth receiving groove facing the second receiving groove;
a first ball member disposed between the first receiving groove and the third receiving groove and comprising a plurality of balls; and
a second ball member disposed between the second receiving groove and the fourth receiving groove and comprising a plurality of balls,
wherein a sum of the diameters of the plurality of balls of the first ball member is different from a sum of the diameters of the plurality of balls of the second ball member.

18. The camera module of claim 17, wherein an uppermost ball and a lowermost ball in an optical axis direction, among the plurality of balls of the first ball member, contact the first receiving groove at two points and the third receiving groove at two points, and
wherein the uppermost ball and the lowermost ball have a greater diameter than at least one ball located between the uppermost ball and the lowermost ball.

19. The camera module of claim 17, wherein each of the plurality of balls of the second ball member has one point contact with any one of the second receiving groove and the fourth receiving groove and two points contact with the other one.

20. The camera module of claim 17, wherein a number of the plurality of balls of the first ball member is greater than a number of the plurality of balls of the second ball member, and
wherein a length of the first receiving groove in an optical axis direction is greater than a length of the second receiving groove in the optical axis direction.

* * * * *